(12) United States Patent
Pischinger et al.

(10) Patent No.: US 6,443,106 B1
(45) Date of Patent: Sep. 3, 2002

(54) COUPLING ELEMENT CONNECTING TWO PARALLEL, SPACED SHAFTS FOR VARYING THEIR POSITION RELATIVE TO ONE ANOTHER

(75) Inventors: Stefan Pischinger, Aachen; Kurt Imren Yapici, Eschweiler, both of (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/700,518

(22) PCT Filed: Mar. 22, 2000

(86) PCT No.: PCT/EP00/02527

§ 371 (c)(1),
(2), (4) Date: Jan. 10, 2001

(87) PCT Pub. No.: WO00/57074

PCT Pub. Date: Sep. 28, 2000

(30) Foreign Application Priority Data

Mar. 24, 1999 (DE) .......................... 199 13 177
Aug. 18, 1999 (DE) .......................... 199 39 210
Feb. 23, 2000 (DE) .......................... 100 08 425

(51) Int. Cl.[7] ................................ F02B 75/04
(52) U.S. Cl. ................... 123/48 B; 123/78 F; 403/62; 464/106
(58) Field of Search .................. 123/48 B, 78 F; 403/62; 464/106

(56) References Cited

U.S. PATENT DOCUMENTS

| 3,407,628 A | | 10/1968 | Eccher |
| 4,439,168 A | * | 3/1984 | Orain .......................... 464/69 |
| 4,612,882 A | * | 9/1986 | Bonfilio .................... 123/44 R |
| 5,700,186 A | * | 12/1997 | Hykes et al. ............... 451/406 |

FOREIGN PATENT DOCUMENTS

| CH | 424 392 | | 5/1967 |
| DE | 1 284 178 | | 11/1968 |
| GB | 2240941 A | * | 8/1991 |

\* cited by examiner

Primary Examiner—Noah P. Kamen
(74) Attorney, Agent, or Firm—Venable; Gabor J. Kelemen

(57) ABSTRACT

The invention relates to a coupling element for connecting two parallel shafts which have an eccentricity, whereby the height of one shaft can be adjusted in relation to a fixed reference plane by means of movement along a rotational path parallel to the axis, whereby the diameter thereof corresponds to said eccentricity, and which is provided with two rotating bodies that are oriented on parallel planes of rotation and are respectively connected to the associated ends of both shafts in addition to being respectively provided with bearing bores at the same radial distance to the respective axis of rotation, whereby crank elements connecting both rotating bodies are mounted therein, the crank radius thereof corresponds to the eccentricity and the cranks elements are arranged in the direction of the periphery at a distance from each other.

8 Claims, 5 Drawing Sheets

COUPLING ELEMENT CONNECTING TWO PARALLEL, SPACED SHAFTS FOR VARYING THEIR POSITION RELATIVE TO ONE ANOTHER

BACKGROUND OF THE INVENTION

This invention related to a coupling element for connecting two parallel shafts extending dehind one another, and having a transverse spacing between them. A coupling element of this type for shafts that are disposed with a fixed transverse spacing between them is known from DE-733 932.

In certain applications, it is necessary for the height of one shaft to be changed relative to a fixed reference plane, while the other shaft maintains its defined position relative to the reference plane. The problem encountered here is that both shafts must rotate in the same direction, and particularly at the same rpm, despite the adjustable alteration of the height relative to the reference plane, and the coupling element is not permitted to effect a fluctuation in rpm for the driven shaft.

An example of an application such as this is a piston-type internal-combustion engine with an alterable combustion chamber, in which the combustion chamber is altered by a raising or lowering of the crankshaft axis of rotation relative to a reference plane.

This kind of piston-type internal combustion engine is known from DE-36 44 721-A; in this case, the aforementioned problem is solved by securing a bearing housing, into which a driving pinion that is connected to the crankshaft extends at one end and, at the other end, a driven pinion that is connected to the driven shaft extends, to an adjusting cam for changing the height of the crankshaft. The axis of rotation of the adjusting cam coincides with the axis of rotation of the driven pinion. Forces are transmitted between the driving pinion at the crankshaft and the driven pinion through a pair of coaxially-rotating wheels, one of which rolls onto the driving pinion, while the other rolls onto the driven pinion. With this arrangement, any height adjustment can be made without rotational irregularities being imposed upon the power take-off. The drawback of the arrangement, however, is that space is only available for small gear diameters, so the entire torque of the piston-type internal-combustion engine must be transmitted by way of gears with a small diameter. This quickly results in limits in the magnitude of the transmittable torque. In addition, the tooth forces must be absorbed as reaction forces by way of a corresponding seating in the immediate vicinity of the gear. A further disadvantage of the arrangement is its relatively long structural length.

SUMMARY OF THE INVENTION

It is the object of the invention to create a coupling element that solves the problems of an adjustable shaft seating, and can be used to transmit large torques, and, at the same time, has a short structural length and can also be used to connect a crankshaft of a piston-type internal-combustion engine to a driving shaft.

According to the invention, this object is accomplished by a coupling element for connecting two shafts extending parallel to an axis, one behind the other, on the same axis and having a transverse spacing between themselves, in which the height of one shaft can be adjusted relative to a fixed reference plane through parallel-axis movements on a rotational path whose diameter corresponds to the maximum transverse spacing, with two rotating bodies that are oriented in parallel rotational planes and can be-connected to the respective associated shaft ends, and are provided, at equal radial distances from the respective axis of rotation, with bearing bores, and with crank elements that connect the two rotating bodies and whose crank radius corresponds to the transverse spacing between the shafts; the crank elements are disposed equidistantly one behind the other in the circumferential direction. With this type of coupling element, it is possible to set arbitrary heights of the shafts moving toward one another parallel to the same axis, within the predetermined eccentricity e; it is ensured here-that the rpm of the driving rotating body is transmitted to the driven rotating body by way of the crank elements without any rpm fluctuations. The dimensioning of the crank elements in the rotating bodies makes them suitable for transmitting the maximum torque. In addition to a corresponding dimensioning, the number of crank elements on one or more different partial rotational paths of the maximum transmittable torque can be increased. A particular advantage of the coupling element of the invention is that no restoring forces act on the bearings of the rotating bodies. This is especially significant in an application in a motor crankshaft.

Corresponding to the torque to be transmitted, it is possible in principle to provide a plurality of crank elements over the circumference of the rotating bodies, in which case the crank elements can be seated with their crank axes on different radii in the associated rotating bodies. In a particularly advantageous embodiment of the invention, it is provided that crank elements are arranged in groups, which, when seen in the circumferential direction, have the same circumferential angle relative to one another. In piston-type internal-combustion engines in which the crankshaft can be adjusted with respect to the stationary driven shaft in the engine housing, this type of grouped arrangement allows for consideration of the firing intervals of the respective internal-combustion engine. This attains an optimum support of the crank elements. Because the effective paths of the transmission forces are parallel in the direction of the connection of the cam center line, the effective lever arm changes with the rotation of the coupling element, so the effective lever arm of the cranks changes periodically from 0 to r, that is, it changes at the crank radius, and can assist proportionally in the transmission of the torque.

In an advantageous embodiment of the invention, it is also provided that the crank element is formed by a first and a second cylindrical body, whose axes are offset from one another. This results in a very short crank element. The arrangement can be such that the cylinders have the same diameter. It is advantageous, however, for the first cylindrical body of the crank element to have a larger diameter than the second cylindrical body, in which instance the second cylindrical body extends inside the outer circumference of the first cylindrical body, and projects beyond it in the axial direction on at least one side. It is advantageous for the region of the first cylindrical body that is not covered by the second cylindrical body to be provided with a recess that reduces an imbalance. The recess can be dimensioned such that the mass "missing" from the first cylindrical body in the form of the recess approximately corresponds to the mass of the second cylindrical body.

For the tilt-free transmission of the torque from the driving rotating body to the driven rotating body, it is provided in a preferred embodiment of the invention that one rotating body, preferably the driven rotating body, has two disk parts, which are fixedly connected to one another with spacing, and the other rotating body, preferably the driving body, is embodied in a disk shape, and the crank elements are respectively seated in the two disk parts of the one rotating body, on the one hand, and in the rotating body located between them, on the other hand. This is possible with a crank element of the above-described type in accordance with the invention, in which a cylindrical body having a smaller diameter than the first cylindrical body projects beyond the first cylindrical body on both sides. A crank element embodied in this manner is seated with its first cylindrical body in the rotating body located between the two disk parts, while the second cylindrical bodies, which have the smaller diameter and are disposed eccentrically with respect to the axis of rotation of the first cylindrical body having the large diameter, are seated in the two disk parts of the other rotating body. A double-seated crank element of this type yields a tilt-free transmission of the torque.

It is especially advantageous for the first rotating body to be fixedly connectable by one disk part to the stationary shaft, and rotatably seated with its other disk part on a stationary support disposed coaxially to this shaft, so this first rotating body is also double-seated, and therefore permits a tilt-free torque transmission.

BRIEF DESCRIPTION OF THE DRAWINGS

The invention is described in detail in conjunction with schematic drawings. Shown are in.

Figure 1:
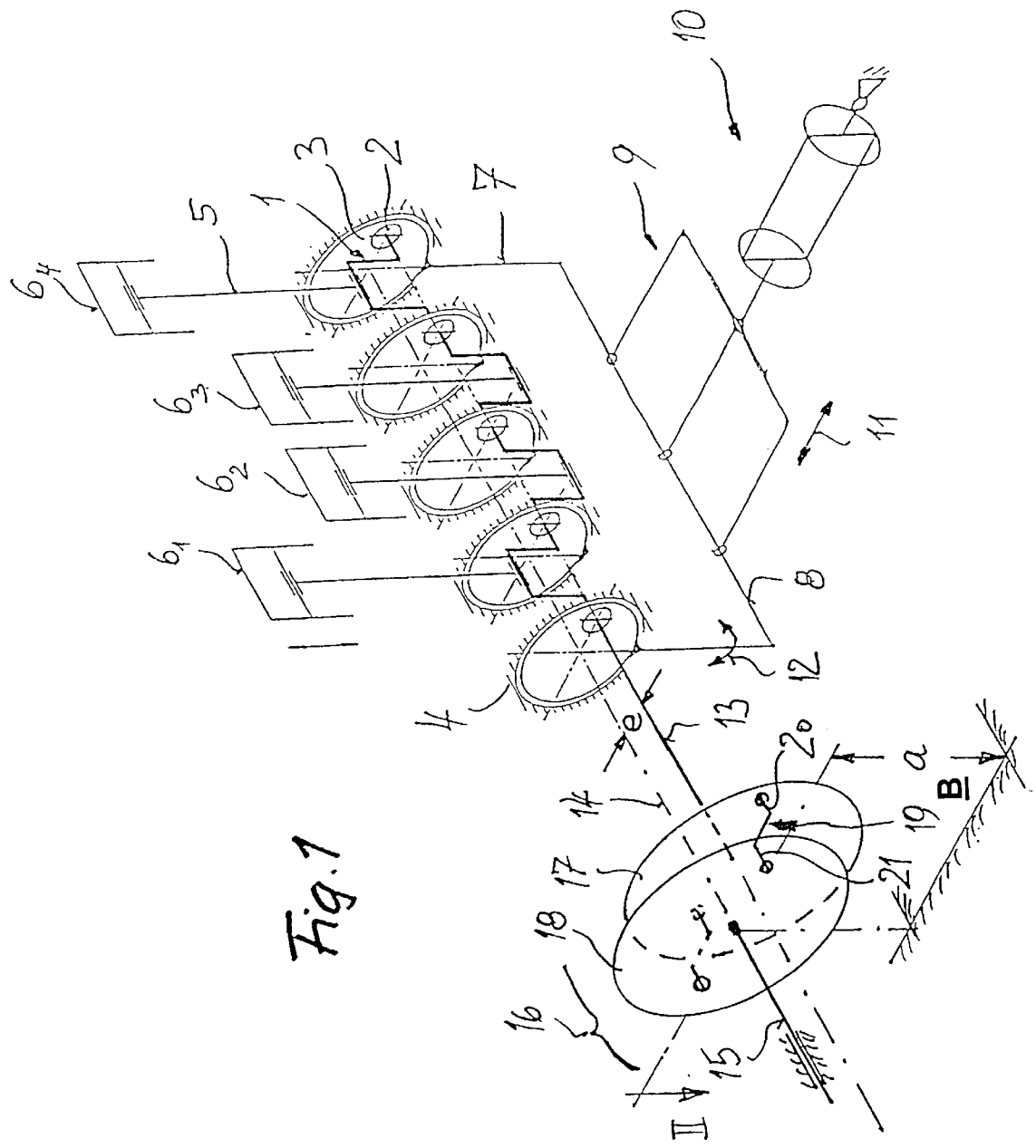
FIG. 1 as an application example, a schematic, perspective representation of a four-cylinder, piston-type internal-combustion engine with a displaceable crankshaft for changing the compression ratio.

As can be seen in the schematic representation according to FIG. 1, a crankshaft 1 of a four-cylinder, piston-type internal-combustion engine is seated with its crankshaft bearings 2 in eccentric rings 3, which are in turn rotatably seated in corresponding support bearings of an indicated engine block 4. The pistons 6, which are only schematically indicated here, are connected to the crankshaft 1 by way of connecting rods 5. The crankshaft is shown in a position in which the pistons $6_1$ and $6_4$ are in the upper dead-center position, while the pistons $6_2$ and $6_3$ are in the lower dead-center position. At least one of the eccentric rings 3 is rigidly connected to a rotation device 7, which is embodied as a pivot lever and is guided out of the rotational path of the crankshaft 1. The pivot levers 7 are fixedly connected to one another by way of a coupling rod 8, which permits a synchronous rotation of all of the eccentric rings 3. The coupling rod 8 is connected to a schematically-illustrated drive 10 by way of a tension element 9. When the tension element moves in the direction of the double-headed arrow 11, the pivot levers 7 are correspondingly pivoted back and forth (double-headed arrow 12), so the axis of rotation 13 of the crankshaft 2 is changed in its height a relative to a horizontal plane B as a reference plane through the rotation of the eccentric rings 3 about a stationary pivot axis 14. The reference numeral 13 is also used hereinafter to represent the shaft end associated with the crankshaft 1.

DESCRIPTION OF A PREFERRED EMBODIMENT

As can be seen in the schematic representation according to FIG. 1, a crankshaft 1 of a four-cylinder, piston-type internal-combustion engine is seated with its crankshaft bearings 2 in eccentric rings 3, which are in turn rotatably seated in corresponding support bearings of an indicated engine block 4. The pistons 6, which are only schematically indicated here, are connected to the crankshaft 1 by way of connecting rods 5. The crankshaft is shown in a position in which the pistons $6_0$ and $6_4$ re in the upper dead-center position, while the pistons $6_2$ and $6_3$ are in the lower dead-center position. At least one of the eccentric rings 3 is rigidly connected to a rotation device 7, which is embodied as a pivot lever and is guided out of the rotational path of the crankshaft 1. The pivot levers 7 are fixedly connected to one another by way of a coupling rod 8, which permits a synchronous rotation of all of the eccentric rings 3. The coupling rod 8 is connected to a schematically-illustrated drive 10 by way of a tension element 9. When the tension element moves in the direction of the double-headed arrow 11, the pivot levers 7 are correspondingly pivoted back and forth (double-headed arrow 12), so the axis of rotation 13 of the crankshaft 1 is changed in its height a relative to a horizontal plane B as a reference plane through the rotation of the eccentric rings 3 about a stationary pivot axis 14. The reference numeral 13 is also used hereinafter to represent the shaft end associated with the crankshaft 1.

The power take-off of the piston-type internal-combustion engine by the shaft end 13 that lengthens the crankshaft 1 is affected by way of a driven shaft 15, which ends flush with the stationary pivot axis 14 of the eccentric rings 3. To bridge the transverse spacing affected by the eccentricity e between the axis of rotation 13 and the axis of the driven shaft 15, the shaft end 13 connected to the crankshaft 1 is connected to the driven shaft 15 by way of a coupling element 16. The coupling element 16 is essentially formed by a first rotating body 17, which is fixedly connected to the shaft end 13 of the crankshaft 1, and a second rotating body 18, which is fixedly connected to the driven shaft 15. The two rotating bodies 17 and 18 are closely adjacent in parallel planes of rotation, and are connected to one another by way of crank elements 19. The crank radius of the crank elements 19 corresponds to the eccentricity e of the axis of rotation 13 of the crankshaft 1 relative to the stationary pivot axis 14 of the eccentric rings 3. The function and structural design are discussed in detail below in connection with FIGS. 2 and 3, while a preferred embodiment is discussed in connection with FIG. 7.

Figure 3:
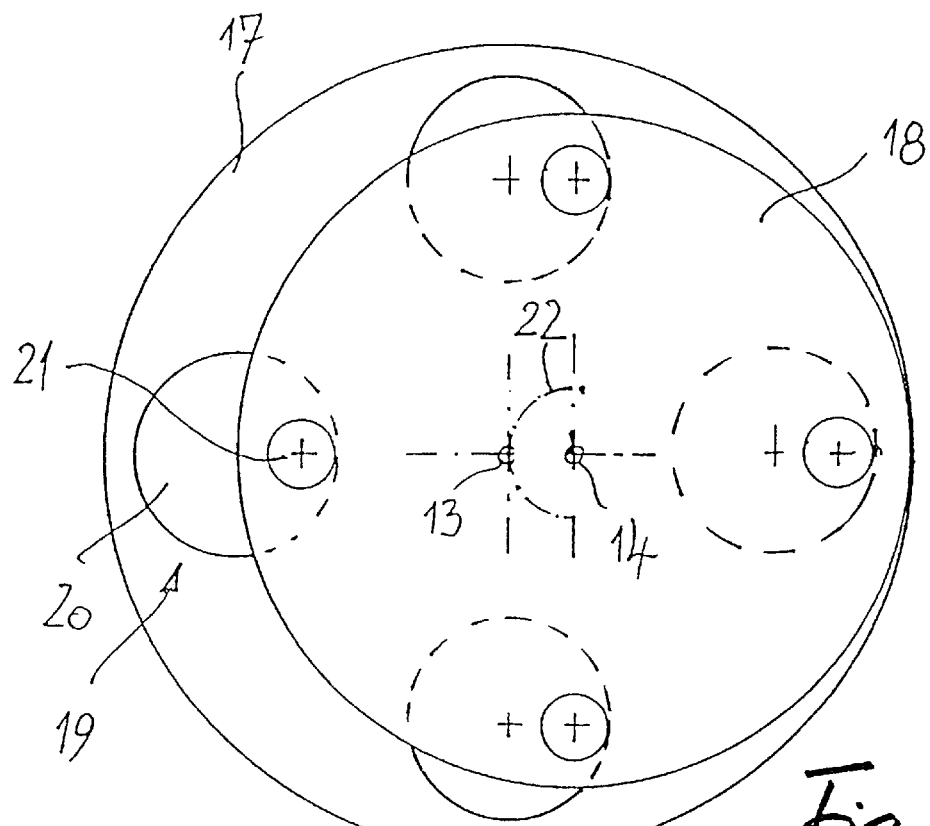
FIG. 3 a plan view of the coupling element according to FIG. 2, seen in the axial direction.
Figure 2:
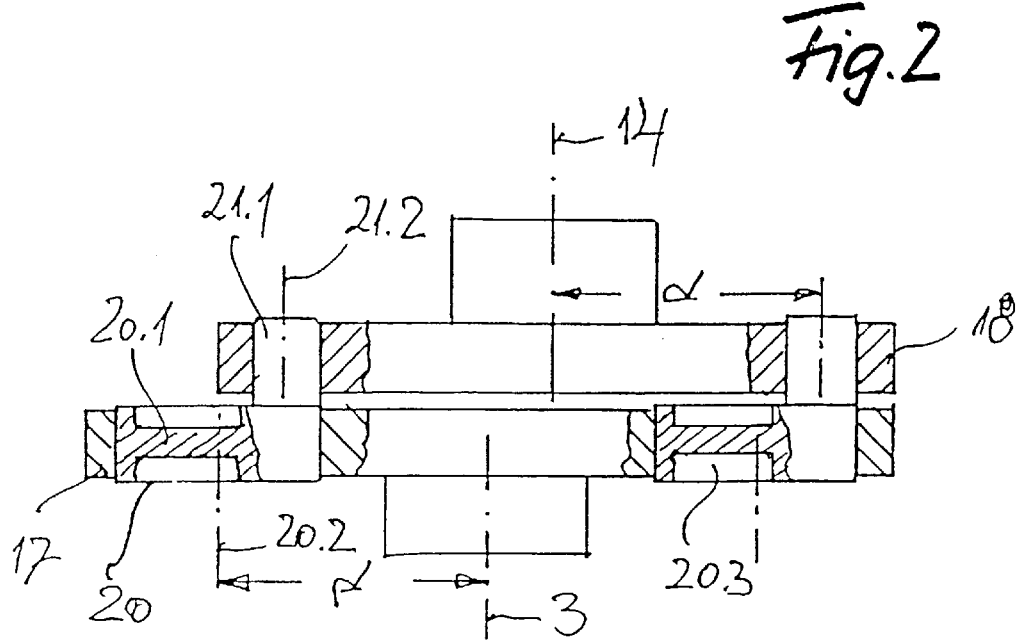
FIG. 2 a horizontal section through a coupling element according to the line II—II in FIG. 1.

FIG. 2 schematically illustrates an embodiment for a coupling element 16 in a vertical section, while FIG. 3 illustrates an embodiment in an associated plan view in the axial direction.

In this embodiment, the shaft end 13 of the crankshaft 1 is fixedly connected to the disk-shaped rotating body 17, for example, whose axis of rotation coincides with the axis of rotation 13 of the crankshaft.

Correspondingly, the driven shaft 15 is fixedly connected to a rotating body 18, whose axis of rotation coincides with the pivot axis 14 of the crankshaft. The axes of rotation 13 and 14 of the two shafts 13 and 15 are oriented along the same axis, and are disposed parallel to the same axis in the transverse spacing of the eccentricity e.

The two rotating bodies 17 and 18 are connected to one another by way of at least two crank elements 19, which are seated to rotate freely with their crank journals 20 and 21 in the associated rotating bodies 17 and 18. The distance between the two crank journals 20 and 21 forms the crank radius, which corresponds to the eccentricity e between the two axes of rotation 13 and 14. The crank bodies are oriented such that their crank arms extend in or parallel to the plane defined by the two axes 13 and 14. As FIG. 2 shows, the crank elements are embodied to have a first cylindrical body 20.1 with a large diameter, and a second cylindrical body 21.1, which has a smaller diameter and is disposed with its axis at a distance from the first cylindrical body. The cylindrical body 20.1 is seated in the driving rotating body 17, while the cylindrical body 21.1 is seated in the driven rotating body 18. The cylindrical bodies forming the crank can be seated in the associated rotating bodies by way of, for example, roller bearings, particularly in the form of needle bearings. In this instance, it can be advantageous for the roller bearings at a rotating body to be elastically supported relative to the rotating body.

As can be seen from the plan view of FIG. 3, four such coupling elements are seated equidistantly, seen in the circumferential direction, in the respective rotating body. The distance R of the axis 20.2 of the crank journal 20.1 corresponds to the distance R of the axis 21.2 of the crank journal 21.1. As can further be seen from FIG. 3, the connecting lines between the two axes of rotation 13 and 14, on the one hand, and the axes 20.2 and 21.2, on the other hand, are oriented in the same direction, namely horizontally in the illustrated embodiment, or parallel to the reference plane B, as also shown in FIG. 1.

As can be seen in the illustrated embodiment in FIG. 3, four such coupling bodies are seated equidistantly over the circumference of the rotating body 17. As can further be seen from FIG. 3, the connecting lines between the two axes of rotation 13 and 14, on the one hand, and the axes of rotation 20.2 and 21.2, on the other hand, are oriented in the same direction, namely horizontally in the illustrated embodiment, or parallel to the reference plane B, as also shown in FIG. 1.

If, as explained in connection with FIG. 3, the crankshaft is displaced through the rotation of the eccentric rings 3 by way of the adjusting device 10, the axis of rotation 13 is moved on a corresponding rotational path 22, and the crankshaft 1 is correspondingly lifted vertically, relative to the horizontal reference plane B, by a distance corresponding to the pivot angle, or, with a rotation in the opposite direction, it is lowered by a corresponding distance.

Because the axes 20.2 and 21.2 of the crank elements are spaced from each other by the same distance as the axes of rotation 13 and 14, the axes 20.2 and 21.2 move on a path corresponding to the rotational path 22. Hence, the same orientation relative to the reference plane B results for the o axes 20.2 and 21.2 of the crank elements 19 as for the axes 13 and 14.

If the rotating body 17 is driven to rotate, the crank elements 19 effect the rotational movement and therefore transmit the torque in the same direction, and without fluctuations in the rpm, onto the rotating body 18, because the orientation of the two crank axes 20.2 and 21.2, as well as the orientation of the two axes of rotation 13 and 14, do not change during the rotational movement. Only the crank elements 19 experience a corresponding relative rotation between the two rotating bodies 17 and 18.

Figure 4:
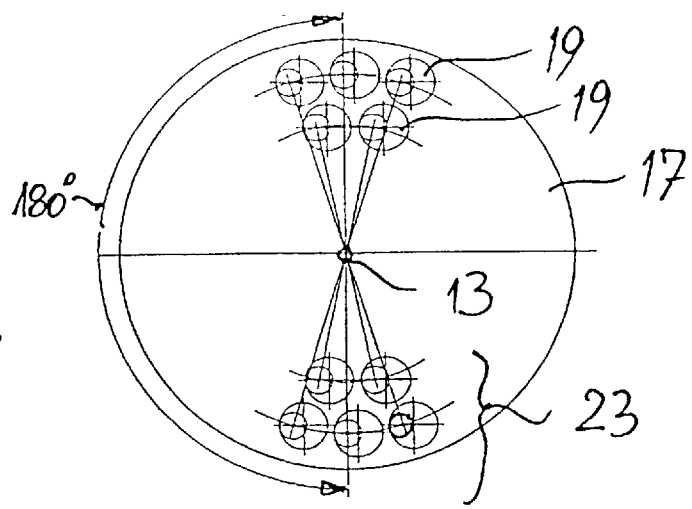
FIG. 4 a plan view of a coupling element having a "coupling star" for a four-cylinder in-line engine.

In the use of such a coupling element in a piston-type internal-combustion engine in the manner described in connection with FIG. 1, it is particularly advantageous not to distribute the crank elements 19 uniformly over the circumference, as indicated in FIG. 3, but to group them in a so-called "coupling star" with consideration of the number of cylinders and the gas-force course dictated by the firing interval of the individual cylinders. FIG. 4 illustrates this type of coupling star for a four-cylinder in-line engine with a firing interval of 180°.

Figure 5:
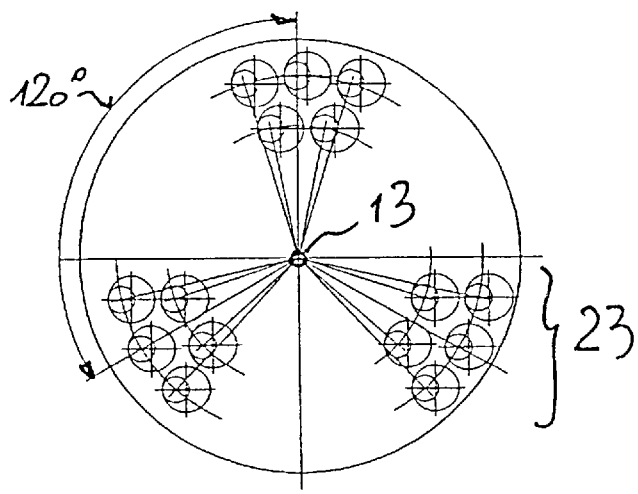
FIG. 5 a plan view, corresponding to FIG. 4, with a "coupling star" for a three-cylinder in-line engine.

FIG. 5 illustrates a coupling star for a three- or six-cylinder in-line engine having a firing interval of 120°.

Figure 6:
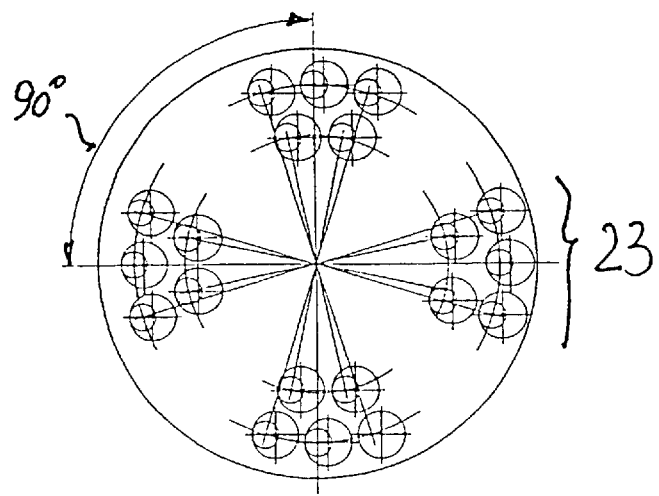
FIG. 6 a plan view, corresponding to FIG. 4, with a "coupling star" for an eight-cylinder in-line engine.

FIG. 6 illustrates a coupling star for an eight-cylinder in-line engine having a firing interval of 90°. FIGS. 4, 5 and 6 illustrate coupling stars for conventional firing intervals and conventional cylinder numbers for four-cycle, piston-type internal-combustion engines. With other numbers of cylinders and other firing intervals, the coupling star must be correspondingly adapted to the crankshaft or the firing interval.

As can be seen from FIG. 4, in both of these design concepts, the individual crank elements 19 are disposed in two groups 23 on the rotating bodies 17 and 18, respectively, the groups being offset by 180°, corresponding to the predetermined crankshaft design for a four-cylinder in-line engine according to FIG. 1. Each group 23 is divided into at least two sub-groups, with the crank elements 19 of one sub-group being disposed at the same distance from the respective axis of rotation of the associated rotating body, for example the axis of rotation 13 of the rotating body 17. The sub-groups are in turn disposed at different distances from the associated axis of rotation of the associated rotating body. The orientation of the coupling star formed by the two groups 23 corresponds to the orientation of the cranks of the crankshaft, i.e., FIG. 4 shows the rotating body 17 for the position of the four-cylinder crankshaft shown in the dead-center position in FIG. 1. Corresponding to FIG. 1, it is thereby ensured that the crank elements are always oriented at a 90° angle with respect to the vertical plane defined by the cylinder axes of the four-cylinder engine. It is advantageous, however, to rotate the coupling star relative to the "crank star" of the crankshaft, specifically such that the coupling star is oriented parallel to the cylinder axis when the cylinders are fired, that is, when the pistons are in their respective firing dead centers.

Figure 8:
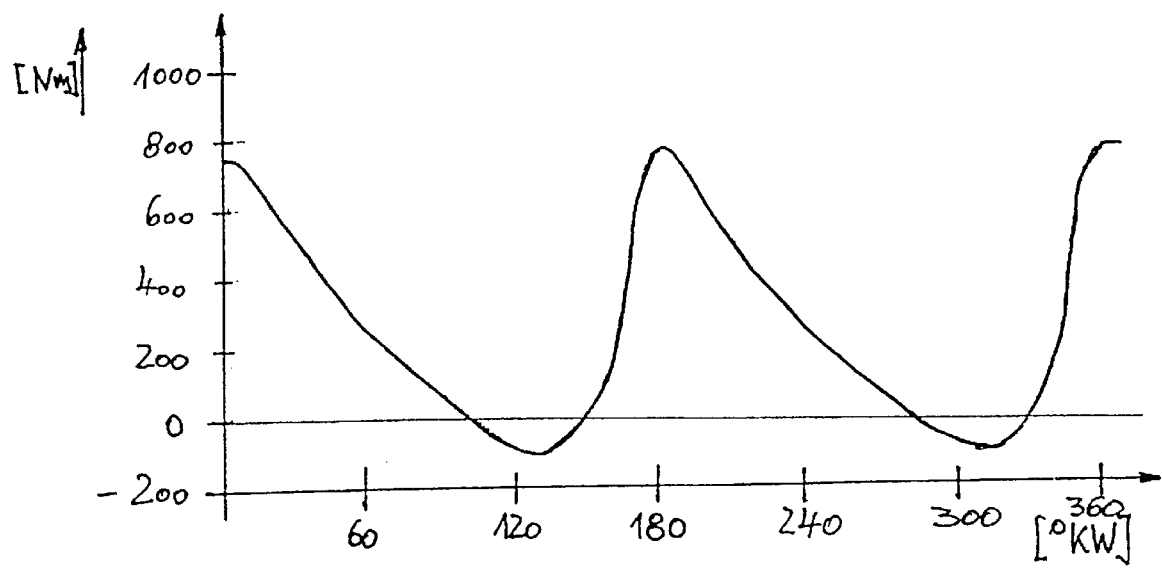
FIG. 8 the torque course as a function of the crankshaft rotation in a four-cylinder, four-cycle in-line engine.

FIG. 8 illustrates the torque course over the crank angle in degrees for a four-cylinder in-line engine having a firing interval of 180°. It can be seen here that a torque maximum occurs in the region of the firing time. If the crank elements are combined into groups, which are matched to the respective piston-type internal-combustion engine, as explained in connection with FIG. 4 for a four-cylinder in-line engine, the groups are disposed such that they are located in the region of the upper dead-center position when the torque maximum acts on the crankshaft. Because the effective radii of the crank elements 19 at the point of rotation are critical for the ability of the crankshaft torque to be transmitted onto the driven shaft, the crank elements can be disposed such that even the largest effective radii are useful in the presence of large forces. This means that a large number of coupling elements must also be in the crank angle of the greatest stress. Measurements have revealed that, in this type of arrangement, the positioning of the crank elements is conformal in terms of stress, and the bearing forces acting on the crank elements are about one-third smaller than in an embodiment according to FIG. 2 or FIG. 3, in which the crank elements are distributed uniformly over the circumference.

The embodiment of a coupling element that is schematically illustrated in FIGS. 2 and 3 can generally be used as a structural machine component. It is also possible, however, to arrange a coupling element having this simple, narrow design in a piston-type internal-combustion engine in the design shown in FIG. 1, namely at the free end of the crankshaft facing away from the driving side of the piston-type internal-combustion engine, for also driving secondary drives secured to the engine housing 4, or for driving a camshaft, if the crankshaft is displaceable, as illustrated, for the purpose of changing the compression ratio of the crankshaft. This simple design is sufficient for transmitting the necessary torques.

Figure 7:
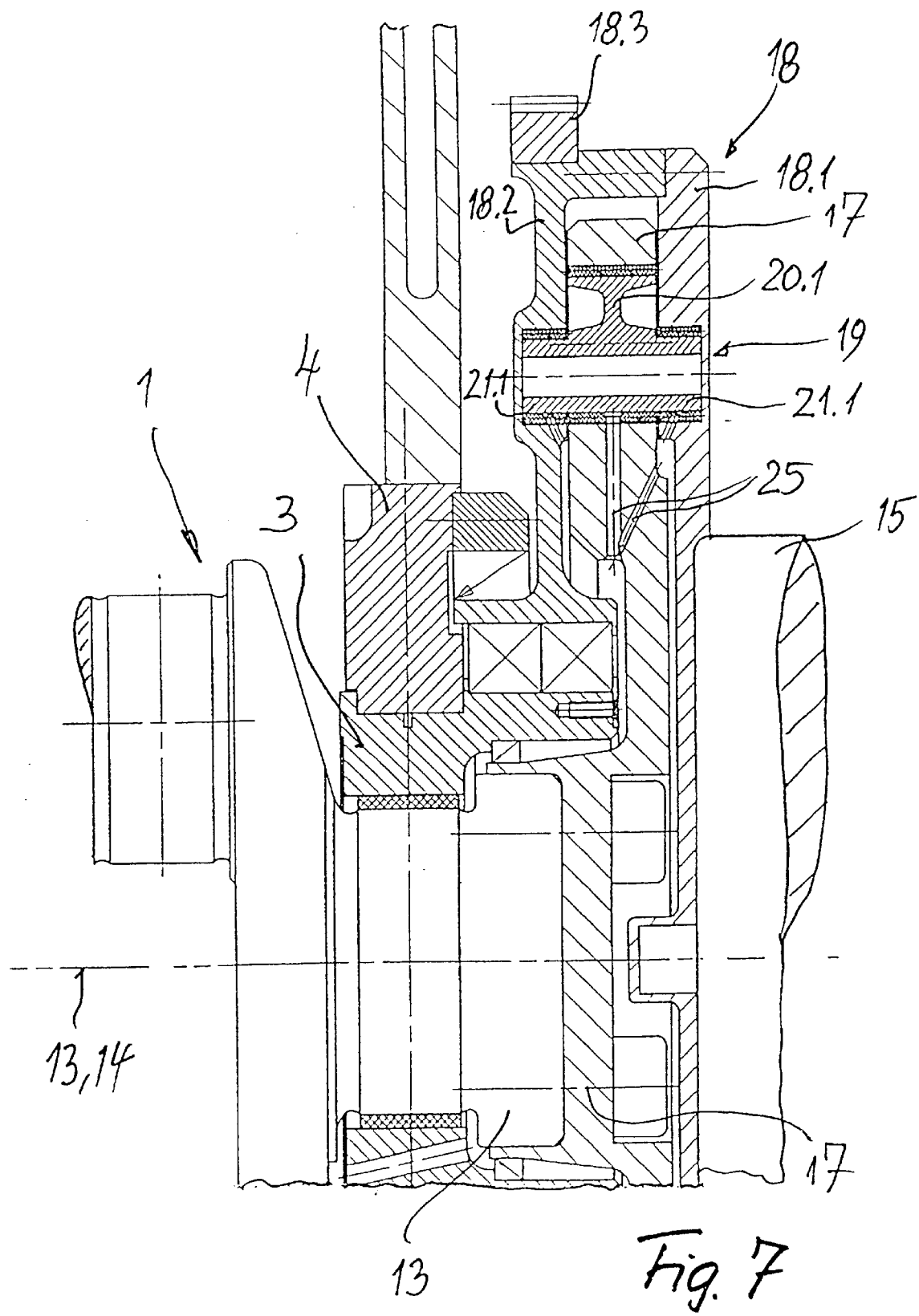
FIG. 7 a vertical section through an embodiment of a coupling element for tilt-free torque transmission.

The entire driving torque of the piston-type internal-combustion engine, however, must be transmittable via the coupling element 16 disposed on the driving side of the engine, so significantly higher torques must be transmitted. FIG. 7 shows a special embodiment for a driving-side coupling element for a piston-type internal-combustion engine.

In this structural shape, the crankshaft 1 is seated in the eccentric ring 3, which is in turn rotatably seated in the engine housing 4, as described in connection with FIG. 1. The disk-shaped rotating body 17 is fixedly connected to the shaft end 13. The driven shaft 15 is in turn connected to the rotating body 18, which, in the illustrated embodiment, has two fixedly-connected disk parts 18.1 and 18.2, between which the likewise disk-shaped rotating body 17 is disposed. The two rotating bodies 17 and 18 are again connected to one another by way of crank elements 19, which, in the illustrated embodiment, have a first, large cylindrical body 20.1 and two cylindrical bodies 21.1 that project beyond both side surfaces of the large cylindrical body, so the crank element 19 is seated on two sides, and is therefore free from tilting-moments, at the rotating bodies 17 and 18.

The disk part 18.2 facing the engine housing 4 is seated via a roller bearing 24 on a corresponding projection of the eccentric ring 3, so the coupling region is also supported properly here.

The crank elements 19 are seated in roller bearings or slide bearings; again, the bearings can be supported in a rubber-elastic manner relative to the corresponding rotating bodies 17 and 18. This is advantageous if the crankshaft itself is seated in a slide bearing. The relatively large radial play of the crankshaft can be compensated by the rubber-elastic seating of the roller bearings at the crank elements. It is advantageous, however, for the crank elements 19 also to be seated on slide bearings if the crankshaft is seated on slide bearings. Seating the rotating body 18 via the disk part 18.2 by means of roller bearings on the eccentric ring 3 ensures that the bearing play of the eccentric rings does not intrude into the seating of the rotating body 18.

The design for the rotating body 18 that is illustrated in FIG. 7 represents a structurally-strong construction in which the crank elements are seated on two sides, and very rigidly. Seating the rotating body 18 on the eccentric ring 3 offers the additional option of providing the rotating body 18 with a gear rim 18.3 that can be brought into engagement with a starter pinion.

The housing-like embodiment of the rotating body 18 also permits the formation of the interior limited by the disk parts 18.1 and 18.2 as an oil chamber that is connected to the engine lubricating system. During operation, this chamber fills to capacity due to the influence of centrifugal force, so oil is supplied by way of the lubrication conduits 25 associated with the individual bearings of the crank elements. The rpm-dependent oil pressure induced by centrifugal force ensures that oil is supplied without fail to the crank element bearings.

FIG. 3 further illustrates the eccentric ring 3, which is seated in its stationary support bearing 4 (only indicated here). When the eccentric ring 3 is rotated in the direction of the arrow 12, the axis of rotation 13 of the crankshaft 1 is moved, along with the crankshaft bearing 2, on a corresponding rotational path 26; the crankshaft is correspondingly raised relative to the horizontal reference plane by a distance that corresponds to the pivot angle, and with a rotation in the opposite direction, it is lowered by a corresponding distance.

Because the axes of rotation 21 and 22 of the bearing parts and counterbearing parts of the coupling element 23 have the same transverse spacing as the axes of rotation 13 and 14, the axis of rotation 21 of the bearing part 19 moves on the same rotational path as the axis of rotation 13 of the crankshaft. Thus, the orientation of the two axes 21 and 22 for the coupling elements 23 between the rotating bodies 17 and 18 is identical to that of the axes 13 and 14 relative to the reference plane B.

If the rotating body 17 is driven to rotate, the rotational movement and therefore the torque are transmitted in the same direction, and without rpm fluctuations, onto the rotating body 18, because the orientation of the two axes of rotation 21, 22 and the orientation of the two axes of rotation 13, 14 do not change during the rotational movement. Only the coupling elements 23 experience a corresponding relative rotation in the rotating bodies 17 and 18.

The above-described crank element 19 can also be modified such that a journal that corresponds to the cylindrical body 21.1 is fixedly disposed on the rotating body 18, with its free end being seated in a corresponding bearing bore in the cylindrical body 20.1. This embodiment is free from tilting moments.

The invention was described above in the context of a piston-type internal-combustion engine. It can likewise be used in all piston engines in which the "active" stroke space of the individual cylinders can be adjusted, for example in a piston compressor, for the purpose of altering the operating conditions by displacing the crankshaft. The fact that the driven shaft, i.e., the crankshaft, is driven without rpm fluctuations in the coupling element of the invention, even when the crankshaft is displaced relative to the driving shaft, eliminates disadvantageous interactions with the drive that may appear with the occurrence of a rotational irregularity due to the coupling.

Moreover, the structural advantages (short length, multiples of the crank elements for transmitting large torques) and operating advantages (constant rpm when the shafts change their relative positions) of the coupling element according to the invention allow it to be used in any applications in which two connected shafts are to experience comparable displacements relative to one another.

What is claimed is:

1. A coupling element interconnecting two parallel-extending, consecutively arranged shafts spaced from one another by an eccentricity; one of said two shafts being a first shaft and the other of said two shafts being a second shaft; a distance of said first shaft from a fixed reference plane being adjustable by displacements of said first shaft parallel to itself along a circular path, whose diameter equals said eccentricity; said second shaft being stationarily supported for rotation; said coupling element comprising (a) two rotary bodies connected to the two shafts, respectively; said rotary bodies having rotational axes and rotational planes oriented parallel to one another;

(b) a plurality of bearing bores provided in each said rotary body; said bearing bores being at identical distances from a rotational axis of respective said shafts; and (c) a plurality of circumferentially spaced crank elements coupling said rotary bodies with one another; said crank elements having a crank radius being identical in length to said eccentricity; said crank elements being arranged in circumferentially identically spaced element groups on respective said rotary bodies; the crank elements belonging to one element group being circumferentially spaced from one another and forming a plurality of sub-groups; the crank elements belonging to one sub-group being at identical distances from said rotational axes of respective said rotary bodies; and said sub-groups being at different distances from said rotational axes of said respective rotary bodies.

2. The coupling element as defined in claim 1, wherein each said crank element is composed of two cylindrical bodies and further wherein said cylindrical bodies are axially offset relative to one another.

3. The coupling element as defined in claim 2, wherein said cylindrical bodies have identical diameters.

4. The coupling element as defined in claim 1, wherein each said crank element is composed of a first and a second cylindrical body having respective first and second diameters; said first diameter being greater than said second diameter; said first cylindrical body having a circumferential outline; said second cylindrical body extending within said circumferential outline and projecting therebeyond in an axial direction at least at one side.

5. The coupling element as defined in claim 4, wherein said second cylindrical body has a portion free from overlap by said first cylindrical body; said second cylindrical body being provided with an imbalance-reducing aperture in said portion.

6. The coupling element as defined in claim 1, wherein one of said two rotary bodies is a first rotary body and the other of said two rotary bodies is a second rotary body; further wherein said first rotary body has two fixedly interconnected disk parts spaced from one another and the second rotary body is disk-shaped and is disposed between said two disks; and further wherein each said crank element is seated between said disk parts of said first rotary body and in said second rotary body.

7. The coupling element as defined in claim 6, further comprising a fixed bearing for supporting said second shaft and a support disposed coaxially with said first shaft; one of said disk parts of said first rotary body being fixedly connected with said second shaft and the other of said disk parts of said first rotary body being rotatably held in said support disposed coaxially with said first shaft.

8. The coupling element as defined in claim 1, in combination with a piston engine; said piston engine comprising (a) a plurality of engine cylinders;

(b) a plurality of pistons received for reciprocation in respective said engine cylinders;

(c) a crankshaft constituting said first shaft;

(d) a plurality of connecting rods coupling said pistons with said crankshaft;

(e) a plurality of eccentric rings supporting said crankshaft eccentrically with respect to an axis of said second shaft; said eccentric rings being rotatable about the axis of said second shaft; and (f) a turning device for rotating said eccentric rings into a determined angular position about the axis of said second shaft.

\* \* \* \* \*